(12) United States Patent
Singh et al.

(10) Patent No.: US 6,818,198 B2
(45) Date of Patent: Nov. 16, 2004

(54) HYDROGEN ENRICHMENT SCHEME FOR AUTOTHERMAL REFORMING

(75) Inventors: Shashi Prakash Singh, Sugarland, TX (US); Avinash Malhotra, Sugarland, TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 246 days.

(21) Appl. No.: 10/065,164

(22) Filed: Sep. 23, 2002

(65) Prior Publication Data

US 2004/0057898 A1 Mar. 25, 2004

(51) Int. Cl.$^7$ .............................. C01B 3/26; B01J 8/00
(52) U.S. Cl. ...................... 423/652; 252/373; 422/190; 422/196; 422/198
(58) Field of Search ........................ 252/373; 423/652; 422/190, 196, 198

(56) References Cited

U.S. PATENT DOCUMENTS 5,023,276 A * 6/1991 Yarrington et al. ......... 518/703

* cited by examiner

Primary Examiner—Stanley S. Silverman
Assistant Examiner—Maribel Medina
(74) Attorney, Agent, or Firm—Kellogg Brown & Root Inc.

(57) ABSTRACT

Recycling a portion of autothermal reformer effluent into the steam-hydrocarbon feed stream with a thermo-compressor ejector is disclosed, using the preheated feed mixture as motive fluid. Syngas recycle-motive fluid molar ratios are 0.2–1.0, selected to optimize the overall configuration. The recycle introduces hydrogen and steam into the feed, and elevates the feed temperature, for operating the reformer in a soot-free regime. There is some pressure drop between the raw feed steam-natural gas mixture and the reformer feed, which requires the raw feed mixture to be supplied at a higher pressure, but this is offset by the lower pressure drop in the process heater and other upstream and downstream equipment due to lower quantities of steam. The feed pre-heater can have a lower duty, and the upstream and downstream equipment can be reduced in size, while the size of the autothermal reformer is about the same compared to the size needed for operation without effluent recycle.

39 Claims, 2 Drawing Sheets

HYDROGEN ENRICHMENT SCHEME FOR AUTOTHERMAL REFORMING

BACKGROUND OF INVENTION

This invention relates to autothermal reforming of steam and hydrocarbon to make syngas, used in manufacturing ammonia, methanol, Fisher-Tropsch synthesis, petroleum upgrading and other processes, and more particularly to autothermal reforming with recycle of a portion of the syngas to facilitate lower steam to carbon ratios without soot formation.

Autothermal steam reforming is well known and has been commercialized successfully. A mixture of steam and hydrocarbon is supplied to the autothermal reformer with air, oxygen-enriched air or oxygen and goes through partial combustion using a specially adapted burner at the top entry. The partial combustion products react on a fixed catalyst to form a syngas that usually includes steam, hydrogen, carbon monoxide and carbon dioxide. This process represents a fundamentally simple, reliable and cost effective technology for syngas production.

One operational characteristic desired for improvement, however, is that the autothermal reformer can also rely on external hydrogen supply for auto-ignition at start-up, e.g. 5 mole percent in the feed. Another characteristic is that a relatively high steam-carbon ratio is generally employed to ensure soot-free operation. High steam-carbon ratios can lead to increased capital costs since larger equipment is needed to heat and supply the feeds to the reformer, as well as to recover waste heat from the reformer effluent. High steam-carbon ratios are not attractive in modern megasyngas plants where minimized equipment sizes are needed to obtain a single-train process and economy of scale. Higher preheat temperatures for the feed mixture is also known to facilitate soot-free operation, but this can likewise be associated with high capital cost and energy consumption.

Recently, it has been suggested to add a pre-reformer in the feed stream of the steam-natural gas mixture to the autothermal reformer. This de-enriches the hydrocarbons and provides some hydrogen in the autothermal reformer feed, facilitating some reduction in the steam-carbon ratio. Still, more improvement in reducing the steam-carbon ratio is desired.

SUMMARY OF INVENTION

The present invention involves recycling a small portion of the autothermal reformer effluent into the steam-hydrocarbon feed stream, preferably with a thermo-compressor ejector that uses the preheated feed mixture as motive fluid. An ejector adapted for high temperature operation can achieve syngas recycle-motive fluid molar ratios from 0.2 to 1. The recycle gas flow rate is thus proportional to the hydrocarbon-steam feed mixture, which gives consistent, well-mixed hydrogen-steam enrichment at the outlet of the ejector. The exact ratio of recycle to motive fluid can be selected for specific applications to optimize the overall configuration.

The recycle introduces both hydrogen and steam, conveniently at an elevated temperature, into the feed to the autothermal reformer. The mixture leaving the ejector has a higher steam-carbon ratio, but also contains hydrogen from the recycle and has a higher feed temperature (where the recycle is at a higher temperature) so that the reformer can be operated in a soot-free regime to avoid plugging the catalyst bed and downstream equipment. There is a slight pressure drop between the raw feed steam-natural gas mixture and the reformer feed due to a loss across the ejector, which requires the raw feed mixture to be supplied at a slightly higher pressure, but this is offset by the lower pressure drop in the process heater and other upstream equipment due to lower quantities of steam in the front end, compared to the prior art without recycle. The process heater can also have a reduced duty, lowering capital costs and energy consumption. The downstream equipment can be reduced in size as well, since the proportion of steam in the reformer effluent is less, e.g. a smaller waste heat boiler and/or reforming exchanger can be used, and smaller other waste heat recovery and cooling equipment can be used. Meanwhile, the size of the autothermal reformer relative to total syngas product is about the same compared to the size needed for operation without effluent recycle.

In one embodiment, the present invention provides a steam reforming process including (a) heating a gas feed stream comprising a raw mixture of hydrocarbon and steam; (b) heating a second stream comprising oxidant gas; (c) supplying the heated gas feed stream in a feed line to an autothermal reformer with the heated second stream in an oxidant supply line; (d) recovering a syngas effluent stream from the autothermal reformer; (e) introducing a portion of the syngas effluent stream as recycle gas into the gas feed stream to obtain a feed mixture comprising hydrogen; (f) wherein a ratio of recycle gas to gas feed stream is from 0.2 to 1; and (g) operating the autothermal reformer at a steam to carbon ratio less than 3.6. The recycle gas is preferably introduced at a thermo-compressor ejector positioned in the feed line using the gas feed stream as motive fluid. The recycle gas is preferably at a higher temperature than the gas feed stream. The hydrocarbon is preferably natural gas. The oxidant gas can be selected from oxygen, oxygen-enriched air and air. The second stream can include steam. The feed mixture comprises from 5 to 50 mole percent hydrogen. The raw mixture preferably has a steam to carbon ratio from 0.6 to 3. The steam reforming process can also include cooling the syngas effluent stream and taking the recycle gas from the cooled syngas effluent stream. The syngas effluent stream can be cooled in a waste heat boiler or a reforming exchanger. Preferably, the ratio of recycle gas to motive fluid is from 0.3 to 0.7 and the feed mixture comprises from 20 to 40 mole percent hydrogen. The method can also include pre-reforming gas feed stream upstream from the ejector, preferably before the heating of the gas feed stream.

In another embodiment, the present invention provides a steam reforming process that includes (a) heating first and second gas feed streams comprising a raw mixture of hydrocarbon and steam; (b) heating a third stream comprising oxidant gas; (c) supplying the first heated gas feed stream in a feed line to an autothermal reformer with the third stream in an oxidant supply line; (d) recovering a first syngas effluent stream from the autothermal reformer; (e) supplying the second heated stream to a reforming exchanger for endothermic catalytic conversion in tubes in the reforming exchanger to form a second syngas effluent stream; (f) mixing the first syngas effluent with the second syngas effluent to form a syngas mixture; (g) passing the syngas mixture across the tubes in the reforming exchanger in heat exchange therewith to supply a cooled syngas product to a syngas product line; (h) introducing a portion of the syngas product as recycle gas into the first gas feed stream to obtain a feed mixture comprising hydrogen, wherein a ratio of recycle gas to first gas feed stream is from 0.2 to 1; and (i) operating the autothermal reformer at a steam to carbon ratio less than 3.6. This is possible in this embodiment due to hydrogen and steam enrichment, as well as any increase in the feed temperature.

In this embodiment, the recycle gas is preferably introduced at a thermo-compressor ejector positioned in the feed line using the gas feed stream as motive fluid. The recycle gas is preferably at a higher temperature than the gas feed stream. The hydrocarbon is preferably natural gas. The oxidant gas can be selected from oxygen, oxygen-enriched air and air. The third stream can include steam. The feed mixture preferably comprises from 5 to 50 mole percent hydrogen. The raw mixture preferably has a steam to carbon ratio from 0.6 to 3. Preferably, the ratio of recycle gas to the first gas feed stream is from 0.3 to 0.7 and the feed mixture comprises from 20 to 40 mole percent hydrogen. The method can also include pre-reforming gas feed stream upstream from the ejector, preferably before the heating of the gas feed stream.

In a further embodiment, the invention provides apparatus for steam reforming. The apparatus includes means for heating a gas feed stream comprising a raw mixture of hydrocarbon and steam and means for heating a second stream comprising oxidant gas. Means are provided for supplying the heated gas feed stream in a feed line to an autothermal reformer with the second stream in an oxidant supply line. Means are provided for recovering a syngas effluent stream from the autothermal reformer. Means are provided for introducing a portion of the syngas effluent stream as recycle gas into the gas feed stream at a thermo-compressor ejector positioned in the feed line using the gas feed stream as motive fluid to obtain a feed mixture comprising hydrogen, wherein a ratio of recycle gas to motive fluid is from 0.2 to 1. Means are provided for operating the autothermal reformer at a steam to carbon ratio less than 3.6. The invention can also include a pre-reformer for pre-reforming the gas feed stream upstream from the ejector, preferably before the heating of the gas feed stream.

In a further embodiment, the present invention provides apparatus for steam reforming that includes means for heating first and second gas feed streams comprising a raw mixture of hydrocarbon and steam, means for heating a third stream comprising oxidant gas, means for supplying the first heated gas feed stream in a feed line to an autothermal reformer with the third stream in an oxidant supply line, means for recovering a first syngas effluent stream from the autothermal reformer, means for supplying the second heated stream to a reforming exchanger for endothermic catalytic conversion in tubes in the reforming exchanger to form a second syngas effluent stream, means for mixing the first syngas effluent with the second syngas effluent to form a syngas mixture, means for passing the syngas mixture across the tubes in the reforming exchanger in heat exchange therewith to supply a cooled syngas product to a syngas product line, means for introducing a portion of the syngas product as recycle gas into the first gas feed stream at a thermo-compressor ejector positioned in the feed line using the first gas feed stream as motive fluid to obtain a feed mixture comprising hydrogen, wherein a ratio of recycle gas to motive fluid is from 0.2 to 1, and means for operating the autothermal reformer at a steam to carbon ratio less than 3.6. The invention can also include a pre-reformer for pre-reforming the gas feed stream upstream from the ejector, preferably before the means for heating of the gas feed stream.

A still further embodiment of the invention provides a method for starting up the apparatus just described, for continuous operation. The method includes the steps of: (a) heating the first and second gas feed streams before starting the third stream, wherein the first and second feed streams are essentially free of added hydrogen; (b) introducing a hydrogen-generating compound into the first stream, second stream, or combination thereof, that is decomposed in the autothermal reformer, reforming exchanger, or combination thereof, respectively, to form hydrogen gas; (c) recycling the syngas product from the reforming exchanger into the first gas feed stream; (d) when the first gas feed stream reaches or exceeds its minimum auto-ignition temperature at the autothermal reformer inlet, starting the third stream to obtain auto-ignition in the autothermal reformer; and (e) after the auto-ignition is established, terminating step (b).

DETAILED DESCRIPTION

Figure 1:
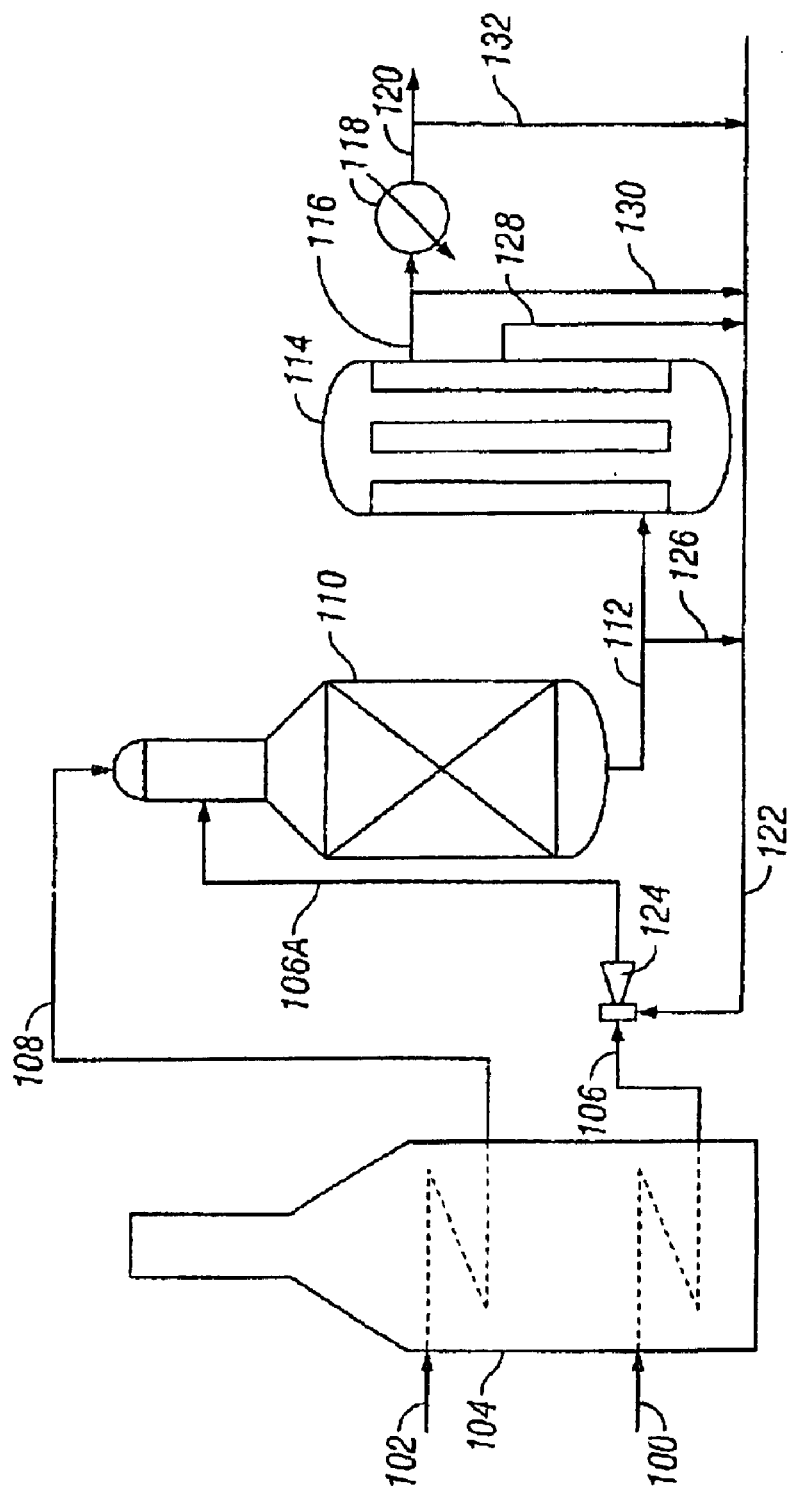
FIG. 1 is a simplified schematic drawing of an autothermal steam reforming process according to one embodiment of the invention wherein the syngas is cooled in a waste heat boiler.

Referring to FIG. 1, there is shown an autothermal steam reforming process according to one embodiment of the invention. A mixture of hydrocarbon and steam is supplied via line 100, and an oxidant gas is supplied via line 102. The hydrocarbon can be any steam reformable hydrocarbon, but is usually naphtha or pre-reformed naphtha, or preferably natural gas. The oxidant gas can be any oxygen-containing gas, such as, for example, air, oxygen-enriched air or oxygen. "Oxygen" refers to essentially pure oxygen as might be obtained from a conventional air separation unit, e.g. 95–99% oxygen, typically about 98% oxygen.

The mixture and oxidant gas are heated in conventional process heater 104, or any other conventional flue gas waste heat recovery system (e.g. gas turbine exhaust), and then supplied via lines 106, 108 to the burner in autothermal reformer 110, which contains reforming catalyst in a manner well known to those skilled in the art. The effluent line 112 from the reformer 110 is then cooled in waste heat boiler 114, supplied via line 116 to cooler 118, and a syngas product is recovered in line 120, as is well known in the art. As one non-limiting typical example, the oxidant and natural gas-steam mixture in lines 106, 108 are heated to about 500° C., the effluent stream 112 is at about 980–1000° C., the discharge from the waste heat boiler 114 is at about 350–700° C., and the temperature in syngas product line 120 is about 50–350° C.

According to the principles of the present invention, a portion of the syngas effluent is recovered downstream from the reformer 110 and recycled via line 122 and thermo-compressor ejector 124 into line 106. Thermo-compressor ejectors are commercially available, and are capable of operating at the temperatures in lines 106 and 112. The thermo-compressor ejector 124 uses the fluid in line 106 to continuously educt recycle gas from line 122 in a consistent ratio into line 106A. At the same time, the ejector 124 thoroughly mixes the streams to facilitate introduction to the burner in the reformer 110 for continuous firing.

The ratio of recycle in line 122 to heater effluent in line 106 should be sufficient to maintain an adequate hydrogen content in line 106A downstream from ejector 124 to avoid soot formation in the reformer 110, preferably from 5 to 50 mole percent hydrogen, more preferably from 20 to 40 mole percent hydrogen in line 106A, dry basis. The molar ratio of fluids in line 122 to line 106 is preferably from 0.2 to 1.0, more preferably from 0.3 to 0.6. The presence of the hydrogen in line 106A, as well increased steam and temperature from the recycle, thus allows the reformer 110 to operate continuously with a lower molar ratio of steam to carbon than in prior art autothermal reformers, i.e. below about 3.6, preferably from 0.6 to 3.0. The particular ratio of steam to carbon is thus selected to optimize the composition of the reformer effluent for the downstream process needs, i.e. a different ratio may be employed for ammonia synthesis as opposed to methanol synthesis, hydrogen generation for a refinery or Fisher-Tropsch, or the like.

The pressure drop between lines 106 and 106A, across the ejector 124 to supply the motive force for introducing the recycle gas, is typically about 150–300 kPa. Thus, the pressure in the discharge from the heater 104 in line 106 will usually be 150–300 kPa greater than without the recycle. Also, since the recycle gas in line 122 can be hotter than the raw feed mixture in line 106, the duty on the heater 104 can be reduced. The recycle gas can be taken anywhere downstream from the reformer 110 via one or more of the lines 126, 128, 130 or 132, depending on the temperature and pressure desired for the recycle gas in line 122. Generally, the further downstream the recycle is taken, the lower the temperature and pressure and steam content, and the higher the hydrogen content. For example, the gas in lines 112 and 126 contains the high temperature effluent directly from the reformer 110, whereas the product gas in lines 120 and 132 is at a much lower temperature and a lower pressure than in line 106, and contains less steam and more hydrogen than in line 112 due to water condensation and separation. Lines 116 and 130 are at a higher temperature and a slightly higher pressure upstream form the exchanger 118 than lines 120, 130. Line 128 shows that the recycle gas can also be taken from the waste heat boiler 114 at an appropriate location corresponding to the desired temperature. The recycle can also be taken from multiple locations with appropriate valving (not shown) to obtain the desired proportions from each respective location for the desired temperature, pressure and composition of the resulting recycle gas mixture.

Figure 2:
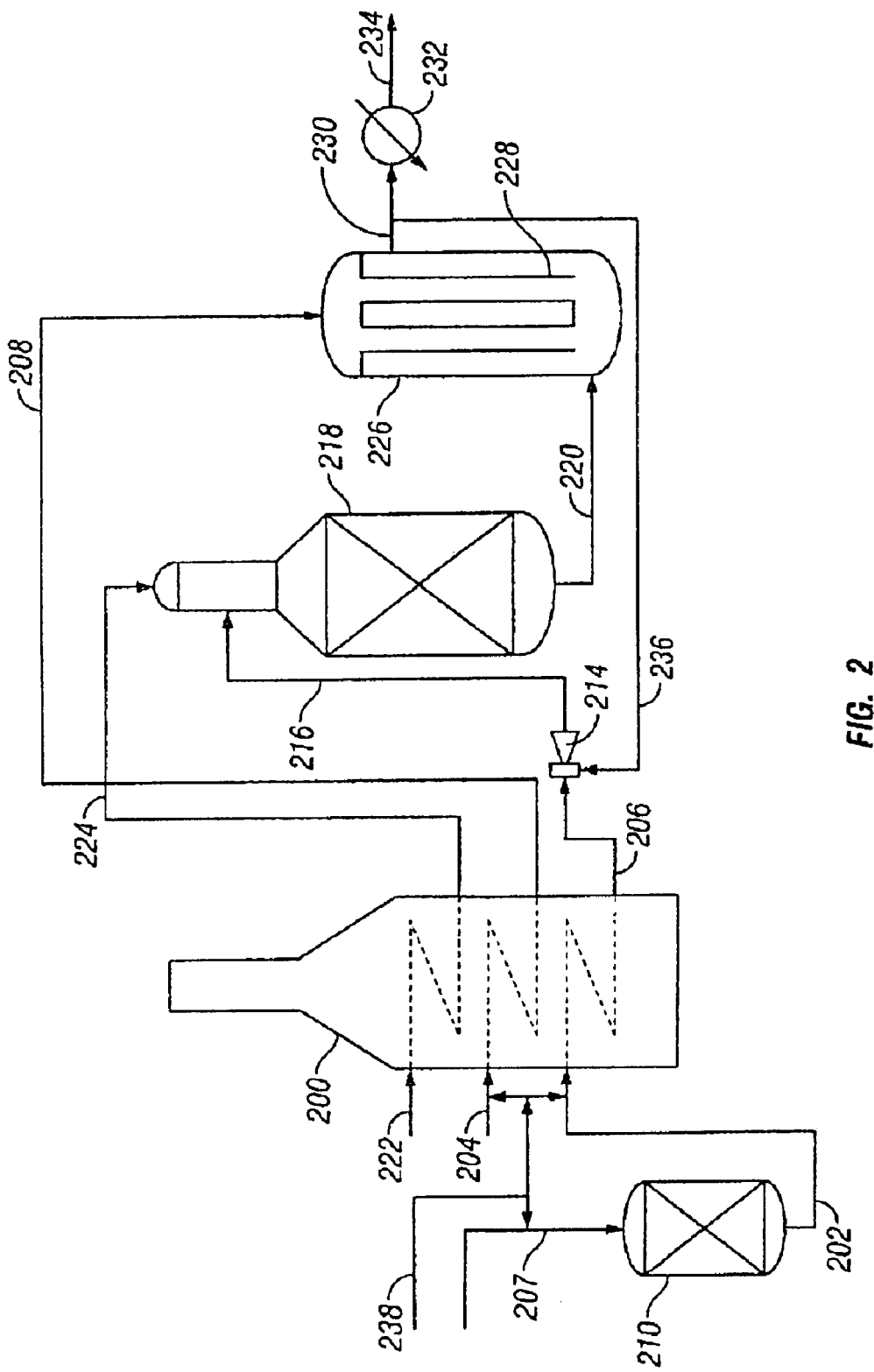
FIG. 2 is a simplified schematic drawing of an autothermal steam reforming process according to one embodiment of the invention wherein a reforming exchanger is used with the autothermal reformer.

With reference to FIG. 2, there is shown a preferred embodiment incorporating a reforming exchanger for additional syngas generation using the effluent from the autothermal reformer to supply heat for the endothermic reforming reactions in the reforming exchanger. The hydrocarbon/steam mixture is supplied to the fired process heater 200 in two different lines 202, 204 to obtain preheated feed mixtures in lines 206, 208, respectively. The feed mixture in line 206 is used as the motive fluid thermo-compressor eductor 214 to educt recycle gas from line 236, and the resulting mixture therefrom is supplied via line 216 to the autothermal reformer 218. A mixture of steam and oxidant gas is supplied via line 222, heated in process heater 200, and passed via line 224 to the autothermal reformer 218, in a manner analogous to that previously described in reference to FIG. 1. A hot syngas effluent is obtained from the autothermal reformer 218 via line 220.

The feed mixture in line 208 is supplied to conventional reforming exchanger 226 where it passes through reforming catalyst typically disposed in each of a plurality of tubes 228. The reformed gas exits the tubes 228 whereupon it is mixed shellside with the hot reformed gas from the autothermal reformer 218 via line 220. The resulting mixture is then passed shellside across the tubes 228 to supply heat for the endothermic reforming reaction that occurs within the tubes 228. The mixed, partially cooled syngas product is obtained via shellside discharge line 230, and can be further cooled in convection heat exchange unit 232 and recovered via line 234. The recycle gas is preferably taken from line 230 and supplied via line 236 to ejector 214 in a manner analogous to that previously described in reference to FIG. 1. The line 236 can alternatively and/or additionally be taken off any point on the shell of reforming exchanger 226 to optimize the temperature and pressure.

In this embodiment, the process duty of the autothermal reformer 218 as well as that of the reforming exchanger 226, does not usually need to be increased compared to the prior art without the recycle, despite the increased flow from the recycle, since the steam-carbon ratio is reduced.

The FIG. 2 embodiment also shows optional pre-reforming where the pre-feed mixture in line 207 is passed through catalytic pre-reformer 210 to facilitate partial conversion to hydrogen and carbon oxides before supplying the gas via line 202 to heater 200 as described above. The pre-reformer 210 can alternatively be located in line 204 upstream from the heater 200, or in line 206 after the heater 200 and upstream form the thermo-compressor ejector 214.

Startup of the autothermal reformer 218 can be advantageously effected according to a preferred method in one embodiment of the invention. Steam/natural gas mixtures in lines 202, 204 are heated in the process heater 200 and supplied to reforming exchanger 226 and autothermal reformer 218 without supplying oxidant gas to the autothermal reformer 218 until the feed in line 216 is above its auto-ignition temperature. The temperature is increased as much as possible, e.g. to 550° C., with an increased firing of the process heater 200. The temperature is further increased and the auto-ignition temperature is reduced by introducing a hydrogen-generating compound, such as, for example, 1–5 percent methanol and/or ammonia, into line 202 and/or 204 upstream from the heater 200 via line 238, preferably at least into line 204. Hydrogen is formed in the pre-reformer 210, autothermal reformer 218 and/or reforming exchanger 226, which is then recycled into the autothermal reformer feed line 216 via ejector 214, which can be operated at a higher ratio of recycle to motive fluid relative to normal operating conditions to maximize hydrogen content in the line 216. Where the pre-reformer 210 is employed, all or part of the hydrogen generating compound is preferably added to line 206 upstream of the pre-reformer (not shown). This startup scheme conveniently avoids the usual scheme in the prior art without the recycle, which involved introducing hydrogen directly into the feed to the autothermal reformer.

EXAMPLE

Some specific examples of operating conditions for the reforming according to the FIG. 2 embodiment are shown in Table 1 for various overall steam-carbon ratios and oxidants:

TABLE 1

| Raw Feed Steam-Carbon Ratio (line 206) (molar) | Oxidant (line 222) | Recycle/Feed Ratio (line 236/line 206) (molar) | Total Feed Steam-Carbon Ratio (line 216) (molar) | H2 ex-Pre-reformer (line 212) (mole %) | H2 in Total Feed (line 216) (mole %) |
|---|---|---|---|---|---|
| 2.7 | Air | 0.33 | 3.2 | 14.6 | 27.4 |
| 2.5 | Air | 0.33 | 2.9 | 13.9 | 26.7 |
| 2.5 | Air | 0.66 | 3.2 | 13.9 | 32.1 |
| 2.7 | 98% O2 | 0.33 | 3.3 | 14.6 | 34.8 |

TABLE 1-continued

| Raw Feed Steam-Carbon Ratio (line 206) (molar) | Oxidant (line 222) | Recycle/ Feed Ratio (line 236/ line 206) (molar) | Total Feed Steam-Carbon Ratio (line 216) (molar) | H2 ex-Pre-reformer (line 212) (mole %) | H2 in Total Feed (line 216) (mole %) |
|---|---|---|---|---|---|
| 2.0 | 98% O2 | 0.33 | 2.4 | 12.3 | 31.9 |
| 1.5 | 98% O2 | 0.33 | 1.7 | 10.5 | 29.2 |
| 1.5 | 98% O2 | 0.66 | 1.9 | 10.5 | 38.4 |
| 0.6 | 98% O2 | 0.66 | 0.64 | 6.6 | 30.2 |
| 0.6 | 98% O2 | 0.40 | 0.6 | 6.6 | 24.1 |
| 2.5 | 98% O2 | 0.33 | 2.9 | 13.9 | 28.6 |
| 2.5 | 98% O2 | 0.66 | 3.3 | 13.9 | 35.0 |

Having described the invention by way of the embodiments illustrated above, many variations and modifications of the invention will be apparent to those skilled in the pertinent art. It is intended that all such variations and modifications within the scope or spirit of the appended claims should be embraced thereby.

What is claimed is:

1. A steam reforming process, comprising:
heating a gas feed stream comprising a raw mixture of hydrocarbon and steam;
heating a second stream comprising oxidant gas;
supplying the heated gas feed stream in a feed line to an autothermal reformer with the second stream in an oxidant supply line;
recovering a syngas effluent stream from the autothermal reformer;
introducing a portion of the syngas effluent stream as recycle gas into the gas feed stream to obtain a feed mixture comprising hydrogen;
wherein a ratio of recycle gas to gas feed stream is from 0.2 to 1;
operating the autothermal reformer at a steam to carbon ratio less than 3.6.

2. The steam reforming process of claim 1 wherein the recycle gas is introduced at a thermo-compressor ejector positioned in the feed line using the gas feed stream as motive fluid.

3. The steam reforming process of claim 1 wherein the recycle gas is at a higher temperature than the heated gas feed stream.

4. The steam reforming process of claim 1 wherein the hydrocarbon comprises natural gas.

5. The steam reforming process of claim 1 wherein the oxidant gas is selected from oxygen, oxygen-enriched air and air.

6. The steam reforming process of claim 5 wherein the second stream includes steam.

7. The steam reforming process of claim 1 wherein the feed mixture comprises from 5 to 50 mole percent hydrogen.

8. The steam reforming process of claim 1 wherein the raw mixture has a steam to carbon ratio from 0.6 to 3.

9. The steam reforming process of claim 1 further comprising cooling the syngas effluent stream and taking the recycle gas from the cooled syngas effluent stream.

10. The steam reforming process of claim 9 wherein the syngas effluent stream is cooled in a waste heat boiler.

11. The steam reforming process of claim 9 wherein the syngas effluent stream is cooled in a reforming exchanger.

12. The steam reforming process of claim 1 wherein the ratio of recycle gas to gas feed stream is from 0.3 to 0.7 and the feed mixture comprises from 20 to 40 mole percent hydrogen.

13. A steam reforming process, comprising:
heating first and second gas feed streams comprising a raw mixture of hydrocarbon and steam;
heating a third stream comprising oxidant gas;
supplying the first heated gas feed stream in a feed line to an autothermal reformer with the third stream in an oxidant supply line;
recovering a first syngas effluent stream from the autothermal reformer;
supplying the second heated stream to a reforming exchanger for endothermic catalytic conversion in tubes in the reforming exchanger to form a second syngas effluent stream;
mixing the first syngas effluent with the second syngas effluent to form a syngas mixture;
passing the syngas mixture across the tubes in the reforming exchanger in heat exchange therewith to supply a cooled syngas product to a syngas product line;
introducing a portion of the syngas product as recycle gas into the first gas feed stream at a thermo-compressor ejector positioned in the feed line using the first gas feed stream as motive fluid to obtain a feed mixture comprising hydrogen;
wherein a ratio of recycle gas to motive fluid is from 0.2 to 1;
operating the autothermal reformer at a steam to carbon ratio less than 3.6.

14. The steam reforming process of claim 13 wherein the recycle gas is introduced at a thermo-compressor ejector positioned in the feed line using the gas feed stream as motive fluid.

15. The steam reforming process of claim 13 wherein the recycle gas is at a higher temperature than the heated gas feed stream.

16. The steam reforming process of claim 13 wherein the hydrocarbon comprises natural gas.

17. The steam reforming process of claim 13 wherein the oxidant gas is selected from oxygen, oxygen-enriched air and air.

18. The steam reforming process of claim 13 wherein the third stream includes steam.

19. The steam reforming process of claim 13 wherein the feed mixture comprises from 5 to 50 mole percent hydrogen.

20. The steam reforming process of claim 13 wherein the raw mixture has a steam to carbon ratio from 0.6 to 3.

21. The steam reforming process of claim 20 wherein the ratio of recycle gas to motive fluid is from 0.3 to 0.7 and the feed mixture comprises from 20 to 40 mole percent hydrogen.

22. Apparatus for steam reforming, comprising:
means for heating a gas feed stream comprising a raw mixture of hydrocarbon and steam;
means for heating a second stream comprising oxidant gas;
means for supplying the heated gas feed stream in a feed line to an autothermal reformer with the second stream in an oxidant supply line;
means for recovering a syngas effluent stream from the autothermal reformer;
means for introducing a portion of the syngas effluent stream as recycle gas into the gas feed stream at a thermo-compressor ejector positioned in the feed line using the gas feed stream as motive fluid to obtain a feed mixture comprising hydrogen, wherein a ratio of recycle gas to motive fluid is from 0.2 to 1;

means for operating the autothermal reformer at a steam to carbon ratio less than 3.6.

23. The apparatus of claim 22 wherein the hydrocarbon comprises natural gas.

24. The apparatus of claim 22 wherein the oxidant gas is selected from oxygen, oxygen-enriched air and air.

25. The apparatus of claim 22 wherein the second stream includes steam.

26. The apparatus of claim 22 wherein the feed mixture comprises from 5 to 50 mole percent hydrogen.

27. The apparatus of claim 22 wherein the raw mixture has a steam to carbon ratio from 0.6 to 3.

28. The apparatus of claim 22 further comprising means for cooling the syngas effluent stream and means for taking the recycle gas from the cooled syngas effluent stream.

29. The apparatus of claim 28 wherein the syngas effluent stream cooling means comprises a waste heat boiler.

30. The apparatus of claim 28 wherein the syngas effluent stream cooling means comprises a reforming exchanger.

31. The apparatus of claim 22 wherein the ratio of recycle gas to motive fluid is from 0.3 to 0.7 and the feed mixture comprises from 20 to 40 mole percent hydrogen.

32. A method for starting up the apparatus of claim 28 for continuous operation, comprising the steps of:

(a) heating the first and second gas feed streams before starting the third stream, wherein the first and second feed streams are essentially free of added hydrogen;

(b) introducing a hydrogen-generating compound into the first stream, second stream, or a combination of said first and second streams, that is decomposed in the autothermal reformer, reforming exchanger, or combination thereof, respectively, to form hydrogen gas;

(c) recycling the syngas product from the reforming exchanger into the first gas feed stream;

(d) when the first gas feed stream reaches or exceeds its minimum auto-ignition temperature at the autothermal reformer inlet, starting the third stream to obtain auto-ignition in the autothermal reformer;

(e) after the auto-ignition is established, terminating step (b).

33. Apparatus for steam reforming, comprising:

means for heating first and second gas feed streams comprising a raw mixture of hydrocarbon and steam;

means for heating a third stream comprising oxidant gas;

means for supplying the first heated gas feed stream in a feed line to an autothermal reformer with the third stream in an oxidant supply line;

means for recovering a first syngas effluent stream from the autothermal reformer;

means for supplying the second heated stream to a reforming exchanger for endothermic catalytic conversion in tubes in the reforming exchanger to form a second syngas effluent stream;

means for mixing the first syngas effluent with the second syngas effluent to form a syngas mixture;

means for passing the syngas mixture across the tubes in the reforming exchanger in heat exchange therewith to supply a cooled syngas product to a syngas product line;

means for introducing a portion of the syngas product as recycle gas into the first gas feed stream at a thermo-compressor ejector positioned in the feed line using the first gas feed stream as motive fluid to obtain a feed mixture comprising hydrogen, wherein a ratio of recycle gas to motive fluid is from 0.2 to 1;

means for operating the autothermal reformer at a steam to carbon ratio less than 3.6.

34. The apparatus of claim 33 wherein the hydrocarbon comprises natural gas.

35. The apparatus of claim 33 wherein the oxidant gas is selected from oxygen, oxygen-enriched air and air.

36. The apparatus of claim 35 wherein the third stream includes steam.

37. The apparatus of claim 33 wherein the feed mixture comprises from 5 to 50 mole percent hydrogen.

38. The apparatus of claim 33 wherein the raw mixture has a steam to carbon ratio from 0.6 to 3.

39. The apparatus of claim 38 wherein the ratio of recycle gas to motive fluid is from 0.3 to 0.7 and the feed mixture comprises from 20 to 40 mole percent hydrogen.

* * * * *